Aug. 23, 1938.  C. M. EASON  2,127,720
METHOD OF FORMING CONE CLUTCH MEMBERS
Original Filed May 27, 1935  2 Sheets-Sheet 1
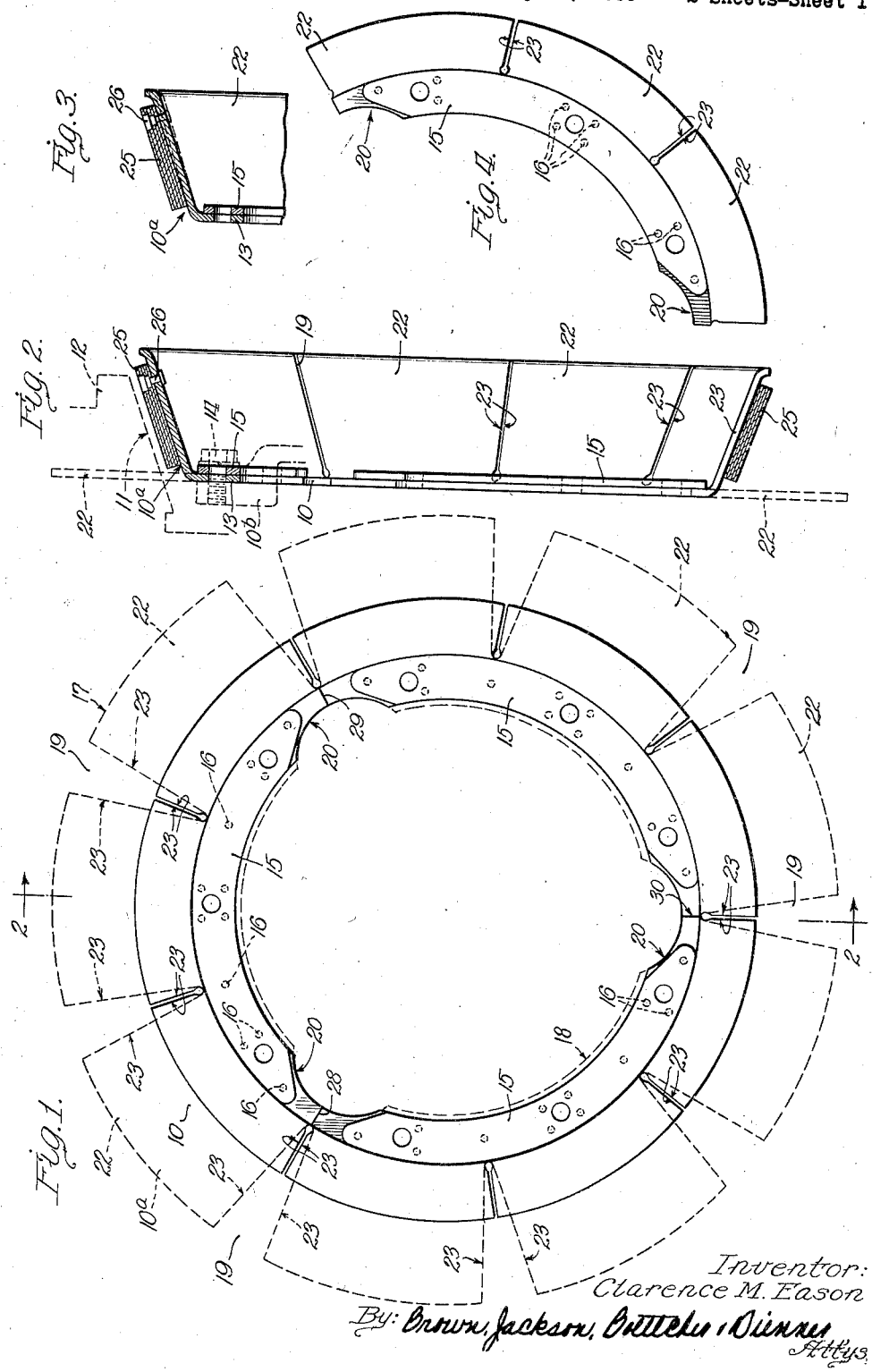
Inventor:
Clarence M. Eason

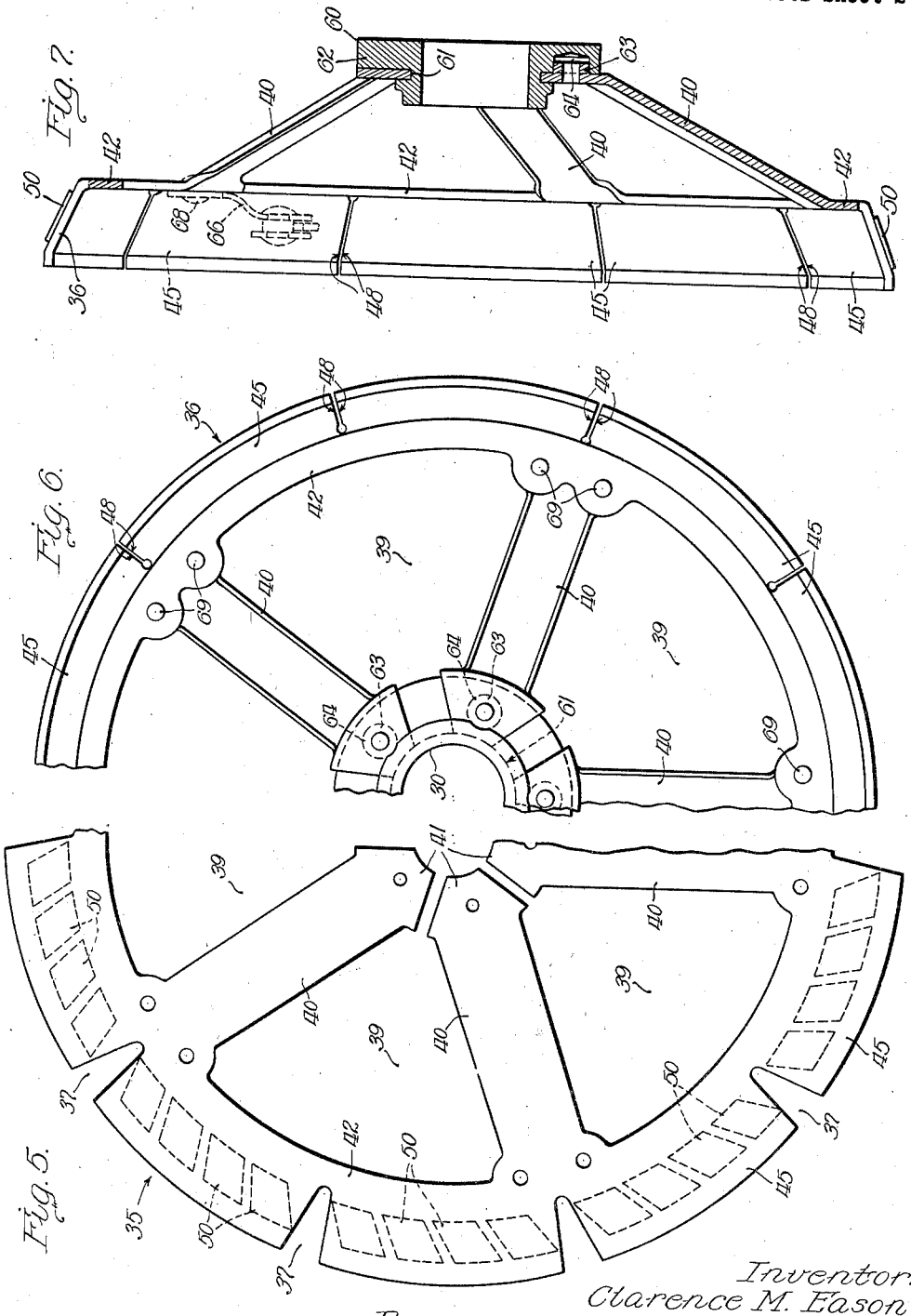

Patented Aug. 23, 1938

2,127,720

UNITED STATES PATENT OFFICE 2,127,720

METHOD OF FORMING CONE CLUTCH MEMBERS

Clarence M. Eason, Waukesha, Wis., assignor to Industrial Clutch Company, a corporation of Wisconsin Original applications May 27, 1935, Serial No. 23,558, now Patent No. 2,090,411, dated August 17, 1937, and August 29, 1935, Serial No. 38,368, now Patent No. 2,059,935, dated November 3, 1936. Divided and this application July 16, 1936, Serial No. 90,932

8 Claims. (Cl. 29—159)

This invention relates to cone friction clutches.

The present application is a division of my prior Patent No. 2,090,411, issued August 17, 1937, and my prior Patent No. 2,059,935, issued November 3, 1936.

One of the main objects of the invention is to provide a new method of forming a cone clutch member which comprises forming a flat blank to the desired configuration, forming in said blank circumferentially spaced notches which open from the outer periphery of the blank and extend inwardly from the outer periphery of the blank, folding and forming the segmental margin portions of the blank between said notches into the form of a cone rim, and securing friction facing material upon said margin portions.

It is also an object of the invention to provide a new method of forming a cone clutch member which comprises forming a flat blank to the desired configuration, forming in said blank circumferentially spaced notches which open from the outer periphery of the blank and extend inwardly from the outer periphery of the blank, securing separate friction facings, preferably of high unit pressure capacity, upon the portions of the blank between said notches and in proximity to the outer margin of the blank while the blank is flat, and thereafter folding and forming the segmental margin portions of the blank between said notches into the form of a cone rim.

It is a further object of the invention to provide a new method of forming a cone clutch member which comprises forming a flat blank to the desired configuration, forming in said blank circumferentially spaced notches which open from the outer periphery of the blank and extend inwardly from the outer periphery of the blank, folding and forming the segmental margin portions of the blank between said notches into the form of a cone rim, securing friction facing material upon said margin portions, and thereafter dividing the member into a plurality of arcuate segments for separate attachment to and removal from a cone rim carrying member.

Further objects and advantages of the invention will be apparent from the following detailed description, taken in connection with the accompanying drawings in which:

Figure 1 is a rear elevational view of a cone rim part embodying the present invention, showing, in dotted lines, the manner of forming the same from flat stock without drawing operations;

Figure 2 is a vertical section taken on the line 2—2 of Figure 1;

Figure 3 is a fragmentary detail section of the cone rim part, showing how the same springs in or collapses in engagement of the clutch, and springs out or expands to an angle slightly greater than the angle of the female clutch surface when the clutch is disengaged;

Figure 4 is a rear elevational view of one of the segments into which the cone rim part is divided;

Figure 5 is a fragmentary view showing the flat blank which is formed into the cone clutch member according to another embodiment of the invention;

Figure 6 is a fragmentary front elevational view of the member shown in Figure 5 after folding and forming the same to the desired form; and Figure 7 is a fragmentary detail section through the cone clutch member formed according to the present invention from the blank shown in Figure 5.

Referring first to Figures 1, 2, 3, and 4, the cone clutch member 10 selected for illustration is in the form of a cone clutch driven member movable into and out of engagement with the inner or female clutch surface 11 of conical form on the flywheel 12, shown in dotted lines in Figure 2, or other driving member.

The cone clutch member 10 is divided into an outer cone rim part 10a and an inner cone rim supporting part 10b. The outer margin of the inner part 10b is offset forwardly as shown in dotted lines in Figure 2, and the forward end of the cone rim part 10a has an inturned radial flange 13 secured to the outer margin of the inner part 10b by means of bolts 14. Segmental reenforcing pieces 15 are preferably spot-welded at 16 (Figure 4) to the flange 13 of the cone rim part to lie between this flange and the heads of the bolts 14, and washers may be employed as and where desired.

The cone rim part 10a is preferably made from sheet steel of the desired gauge, or other suitable flat stock. The flat sheet is stamped or otherwise cut to the annular form shown in Figures 1 and 2, the outer periphery being shaped to the configuration indicated at 17, and the central portion of the sheet being removed along the inner periphery 18 of the annular member thus formed. The flat annular member is notched or divided at circumferentially spaced positions along its outer periphery as shown at 19. These notches or divisions 19 are of generally V-shaped form, with their wide ends at the outer periphery 17 of the flat annular member and their inner ends spaced outwardly from the inner periphery 18 a radial distance approximately equal to the radial dimension of the flange 13. The inner periphery 18 is scalloped at three positions equi-spaced circumferentially, as shown at 20, to give clearance around the tubular bosses (not shown) formed on the inner cone clutch part 10b as illustrated in my prior Patent No. 2,090,411, issued August 17, 1937.

The blank cut or punched centrally from the flat annular member may be used as the clutch abutment plate as more fully disclosed in the foregoing patent, in which case it may be provided with a central opening and formed as desired.

The annular blank with its outer margin slotted or notched, and which is to constitute the cone rim part, is then placed between a pair of conical die members (not shown) and pressed to form the conical rim part with the flange 13 as shown in Figure 4. The die means, instead of drawing a conical rim from flat stock, which is a difficult manufacturing operation requiring large and expensive presses, merely folds or forms the freed portions 22 between the notches 19 in from the plane of the flange part 13 to the desired conical form as shown. The performance of this bending and forming operation between the pair of conical die members is a single shaping operation, as distinguished from the multiple operations necessary in a drawing or swaging method of treatment. The edges 23 of the segment-like portions 22 preferably abut when the rim is collapsed or contracted as shown in dotted lines in Figure 3. The cone rim thus collapsed or contracted is in the form of a continuous arch structure with each segment-like portion acting as a keystone or arch in said structure. As a result, this arched structure of the cone rim has just as much strength as a solid cone rim.

By avoiding the difficult drawing operations for drawing a cone rim from flat stock and employing merely a folding and forming operation to bring the segment-like portions 22 to the desired conical form, the cost and difficulty of forming the cone rim are greatly reduced. The drawing operations heretofore employed, in addition to being difficult, required large and costly presses, whereas the folding and forming operation which I employ can be done on a small inexpensive press. The use of the central portion of the flat stock, which is stamped or otherwise removed from within the inner periphery 18 of the annular cone rim forming member, as the abutment plate further reduces the cost.

In addition, due to the inherent springiness of the stock which is preferably employed, the conical segments 22 have a tendency to spring open slightly. This gives the conical rim of the cone member 10 a slightly greater angle than the cooperating female cone surface 11 of the flywheel or driving clutch part 12 as shown in full lines in Figure 3. As a result, when the clutch is engaged, the cone rim bears, first, on its outer enlarged portion and, with comparatively little force, is collapsed to proper angularity as shown in dotted lines in Figure 3 for full engagement with the clutch surface 11. This gives a softer acting clutch which engages more smoothly and in which the tendency of the clutch to grab, stutter, or chatter during engagement is eliminated.

This springiness of the cone rim part in the operation of the clutch is an important aspect of the present invention. The advantages above set forth are obtained without placing a spring under the clutch facing or lining to give an initial grab and make the clutch smoother acting as commonly resorted to heretofore in the art. When the cone rim 10a is in full engagement with the clutch surface 11, the edges 23 of the segment-like portions 22 are, as already pointed out, preferably in abutting engagement and present a solid cone rim of great strength.

Upon bringing the cone rim part 10 into the desired conical form in the manufacture of this part, it is completed, turned, machined, or otherwise finished, and the lining or facing 25 is secured thereto as by means of rivets 26, preferably while the part 10 is in one piece. The lining or facing 25 may be the usual or any suitable or preferred friction facing or lining material. The completion and finishing of the cone part 10 with its friction facing 25, while this part 10 is in one piece, enables bringing this part to true and accurate form.

After the part 10 has been completed and finished and the friction facing 25 has been applied thereto, this part, with its facing 25, is then divided at 28, 29 and 30 into three or any other desired number of equal length segments. The divisions 28, 29 and 30 are preferably equi-spaced circumferentially so that the cone segments will be interchangeable, but this may vary within the scope of the present invention. The cone segments are secured to the inner hub part 10b by the bolts 14, and the sectionalized cone clutch driven member 10, comprising the cone rim section constituting the outer cone part 10a and the inner part part 10b, is ready for use.

The three segments constituting the cone rim part 10a are preferably of convenient size to be easily removed and replaced through the handhole of the clutch housing (not shown). By unbolting the cone segments forming the cone rim 10a from the inner part 10b, these segments may be separately removed as for example, through the usual hand-hole, refaced with friction facing material 25, returned through the hand-hole, and reapplied to the inner part 10b without taking the driving shaft or other parts away from the driving clutch part as heretofore necessary where the cone clutch part was made up in one piece. And removal and refacing of the cone segments are permitted without separating the clutch housing from the flywheel housing or otherwise dismantling the clutch.

The cone clutch member 35 shown in Figures 5, 6, and 7, with its cone rim 36, is likewise preferably made of sheet steel of the desired gauge, or other flat stock similar to the stock employed in connection with the preceding embodiment of the invention. This flat sheet is stamped or otherwise cut to the form shown in Figure 5, and its outer periphery is notched at circumferentially spaced locations at 37. The notches 37 are of generally V-shaped form, with their wide ends at the outer periphery 38 of the flat member and their inner ends spaced outwardly from the inner periphery of the rim forming part of the member. Circumferentially spaced sector-like portions are stamped or otherwise cut out to form the openings 39 with the radial arms or spokes 40 disposed between the respective openings. The outer ends of the arms 40 are integral with the rim forming part of the plate, and the inner ends of these arms are separated and shaped as shown at 41.

The blank, with its outer margins slotted at 37 and which is to constitute the sliding clutch member, is placed between a pair of conical die members (not shown) and pressed to form the conical rim part 36 with the flange 42 and the connecting arms 40 as shown in Figures 6 and 7. The folding or forming of the freed portions 45 between the notches 37 in from the plane of the flange 42 to the desired conical form, as distinguished from drawing a conical rim from flat stock, has the advantages set forth in connection with the preceding embodiment of the invention. The edges 48 of the segment-like portions 45 preferably abut when the rim is collapsed or contracted, whereby the cone rim is in the form of a continuous arch structure with each segment-like portion 45 acting as a keystone or arch in said structure. As a result, the cone rim has just as much strength as a solid cone rim when in full engagement with the co-operating clutch member.

As in the preceding embodiment of the invention, the conically arranged segments 45 have a tendency to spring open slightly due to the inherent springiness of the stock which is preferably employed. As in the preceding embodiment, this gives the conical rim 36 a slightly greater angle than the cooperating female cone surface of the cooperating clutch member. As a result, when the clutch is engaged, the cone rim bears first on its outer enlarged portion and, with comparatively little force, is collapsed to proper angularity for full engagement with the cooperating clutch surface. When in full engagement, the edges of the segment-like portions preferably abut and provide a cone rim of great strength.

The outer conical surfaces of the cone rim segments 45 are faced with a friction material preferably of high unit pressure capacity. This friction material may be in the form of thin light-weight metallic friction pads 50 of high unit pressure capacity brazed to the conical rim forming segments 45. Instead of being in the form of separate circumferentially spaced pads 50, this metallic friction facing may be in the form of arcuate facing strips, each of a length substantially equal to the lengths of the respective segments 45.

Friction facings formed of this material may be very thin and light in weight and, at the same time, are capable of taking five times as much pressure per unit of area as any of the friction materials now comonly employed in cone clutches. It is to be understood that any friction material of high unit pressure capacity may be employed within the scope of this aspect of the invention, and certain features of the present invention may be employed regardless of the character of the friction facing material.

In the case of metallic friction facings of high unit pressure capacity, these facings are preferably brazed or secured to the cone rim forming part in equivalent manner while the blank is flat and, preferably, before folding and forming the segment-like portions 45 and the arms 40 to the desired form. Where the friction material is secured to the cone rim forming part while the blank is flat, the segment-like portions 45 are preferably relatively short circumferentially, i. e., the notches 37 are disposed about an inch apart. It is to be understood, however, that the present invention is not limited to the particular lengths of these segment-like portions unless such lengths are specifically included in the appended claims.

The folding and forming of the cone rim to the desired shape as distinguished from drawing it to shape, has special correlation with respect to the friction facing or facings of high unit pressure capacity, in that these facings may be applied to the flat blank and the blank then folded and formed to shape without cracking or loosening the facings. If the outer margin of the blank were continuous and drawn to shape, the friction facings would be subjected to the drawing operation, and because of brittleness, would tend to crack or loosen from the plate.

Upon bringing the cone rim part into the desired conical form and sloping the arms 40 rearwardly and inwardly with their inner ends turned radially, the cone rim 35 is applied to the hub 60. The hub 60 has an annular groove 61 and an annular shoulder 62. The inner ends of the arms 40 are placed against the shoulder 62, with their inner edges engaged in the groove 61 as shown in Figure 7. The inner ends of the arms have small openings 63 adjacent recesses 64 in the hub, and the walls of the arms 40 adjacent the openings 63 are punched into recesses 64 to hold the inner ends of the arms 40 against radial displacement from the hub and to connect the cone rim 36 and hub 60 against relative rotation. The disc 66 is the disc of the flexible driving connection between the cone rim part and the driving hub, as more fully disclosed in my prior patent number 2,059,935 issued November 3, 1936. This disc is riveted at 68 to the flange portion 42 of the sliding cone member, the flange 42 being provided with apertured scallops 69 for this purpose, as shown in Figure 6.

I do not intend to be limited to the precise details shown or described.

I claim:

1. The method of forming a cone clutch member which comprises forming a flat blank to the desired configuration, forming in said blank circumferentially spaced notches which open from the outer periphery of the blank and extend inwardly to positions spaced inwardly from the outer periphery of the blank, securing separate friction facings preferably of high unit pressure capacity upon the portions of the blank between said notches and in proximity to the outer margin of the blank while the blank is flat, and thereafter folding and forming the segmental margin portions of the blank between said notches into the form of a cone rim.

2. The method of constructing a male cone clutch member consisting of a plurality of substantially identical arcuate sections, which comprises first producing a substantially flat circular blank having a relatively large circular area cut out of the center of the blank, welding segmental reenforcing members to the inner peripheral portion of the blank, cutting out a plurality of V-shaped notches in the outer peripheral portion of the flat blank to define a series of circumferential segments between said notches, then pressing said blank between inner and outer conical dies to effect, in a single operation, the bending of said circumferential segments substantially to the pitch angle of the desired cone and also to effect the forming of said circumferential segments to the circular cross section of said cone, whereby to form a conical rim flaring outwardly from the radially extending portion of the blank, said notches being proportioned whereby sufficient surplus metal is removed so that substantially no drawing of the remaining metal in said circumferential segments is necessary in the operation of bending and forming said conical rim, but in which conical rim the adjacent edges of the circumferential segments are in such close proximity that said edges will be caused to abut with each other when the clutch member is pressed into its coacting clutch element, then securing friction facing material to the outer surfaces of said segments, and finally dividing the member into a plurality of arcuate sections for separate attachment to and removal from a cone clutch carrying member.

3. The method of constructing a male cone clutch member consisting of a plurality of substantially identical arcuate sections, which comprises first producing a substantially flat circular blank having a relatively large circular area cut out of the center of the blank, cutting out a plurality of V-shaped notches in the outer peripheral portion of the flat blank to define a series of circumferential segments between said notches, then pressing said blank between inner and outer conical dies to effect, in a single operation, the bending of said circumferential segments substantially to the pitch angle of the desired cone and also to effect the forming of said circumferential segments to the circular cross section of said cone, whereby to form a conical rim flaring outwardly from the radially extending portion of the blank, said notches being proportioned whereby sufficient surplus metal is removed so that substantially no drawing of the remaining metal in said circumferential segments is necessary in the operation of bending and forming said conical rim, but in which conical rim the adjacent edges of the circumferential segments are in such close proximity that said edges will be caused to abut with each other when the clutch member is pressed into its coacting clutch element, then securing friction facing material to the outer surfaces of said segments, and finally dividing the member into a plurality of arcuate sections for separate attachment to and removal from a cone clutch carrying member.

4. The method of constructing a male cone clutch member consisting of a plurality of substantially identical arcuate sections, which comprises first producing a substantially flat circular blank having an opening in the center thereof, cutting out a plurality of V-shaped notches in the outer peripheral portion of the flat blank to define a series of circumferential segments between said notches, then pressing said blank between inner and outer conical dies to effect, in a single operation, the bending of said circumferential segments substantially to the pitch angle of the desired cone and also to effect the forming of said circumferential segments to the circular cross section of said cone, whereby to form a cone rim flaring outwardly from the radially extending portion of the blank and in which the adjacent edges of the circumferential segments are in such close proximity that said edges will be caused to abut with each other when the clutch member is pressed into its coacting clutch element, and dividing the member into a plurality of arcuate sections for separate attachment to and removal from a cone clutch carrying member.

5. The method of constructing a male cone clutch member consisting of a plurality of substantially identical arcuate sections which comprises first producing a substantially flat circular blank having an opening in the center thereof, cutting out a plurality of V-shaped notches in the outer peripheral portion of the blank to define a series of circumferential segments between said notches, then pressing said blank between inner and outer conical dies to effect the bending of said circumferential segments substantially to the pitch angle of the desired cone and also to effect the forming of said circumferential segments to the circular cross section of said cone, whereby to form a cone rim in which the adjacent edges of the circumferential segments are in such close proximity that said edges will be caused to abut with each other when the clutch member is pressed into its coacting clutch element, and dividing the member into a plurality of arcuate sections for separate attachment to and removal from a cone clutch carrying member.

6. The method of constructing a male cone clutch member consisting of a plurality of substantially identical arcuate sections, which comprises first producing a substantially circular blank having an opening in the center thereof, cutting out a plurality of notches in the outer peripheral portion of the blank to define a series of circumferential segments between said notches, then pressing said blank between inner and outer conical dies to bend said circumferential segments substantially to the pitch angle of the desired cone and also to shape said circumferential segments to the circular cross section of said cone, whereby to form a cone rim flaring outwardly from the radially extending portion of the blank, securing friction facing material to the outer surfaces of said segments and dividing the member into a plurality of arcuate sections for separate attachment to and removal from a cone clutch carrying member.

7. The method of making a cone clutch member consisting of a plurality of separate arcuate sections, which comprises cutting a plurality of notches in the outer peripheral portion of a substantially flat disk to form a series of circumferential segments between the notches, then pressing said disk between a pair of conical dies to bend said segments into the form of a conical flange flaring outwardly from the substantially radially extending portion of the disk, and then dividing the flanged disk into a plurality of arcuate sections for separate attachment to and removal from a cone clutch carrying member.

8. The method of constructing a male cone clutch member, which comprises first producing a substantially flat circular blank having an opening in the center thereof, cutting out a plurality of inwardly extending V-shaped notches in the outer peripheral portion of the blank to define a series of circumferential segments between said notches, then pressing said blank between inner and outer conical dies to effect, in a single operation, the bending of said circumferential segments substantially to the pitch angle of the desired cone and also to effect the forming of said circumferential segments to the circular cross section of said cone, whereby to form a cone rim flaring outwardly from the radially extending portion of the blank and in which the adjacent edges of the circumferential segments are in such close proximity that said edges will be caused to abut with each other when the clutch member is pressed into its coacting clutch element, and then securing friction facing material to the outer surfaces of said segments.

CLARENCE M. EASON.